United States Patent
Guard et al.

(10) Patent No.: US 6,631,770 B2
(45) Date of Patent: Oct. 14, 2003

(54) LANDSCAPING MULCH TURNER AND TREATMENT APPLICATOR AND METHOD OF USING THE SAME

(75) Inventors: Tony M. Guard, Union, KY (US); Paul Haney, Cincinnati, OH (US); Douglas Ortenzi, Burlington, KY (US); Joseph Stephens, Middletown, OH (US); James Tobergta, Batavia, OH (US)

(73) Assignee: Gravity, Incorporated, Cincinnati, OH (US)

( * ) Notice: Subject to any disclaimer, the term of this patent is extended or adjusted under 35 U.S.C. 154(b) by 0 days.

(21) Appl. No.: 09/975,999

(22) Filed: Oct. 11, 2001

(65) Prior Publication Data

US 2002/0074138 A1 Jun. 20, 2002

Related U.S. Application Data

(60) Provisional application No. 60/239,110, filed on Oct. 11, 2000.

(51) Int. Cl.[7] .............................................. A01B 45/00
(52) U.S. Cl. ........................................ 172/21; 172/378
(58) Field of Search ........................... 172/378, 21, 22, 172/929, 351–356; 111/118, 105, 106; 56/249, 294

(56) References Cited

U.S. PATENT DOCUMENTS

| | | | | |
|---|---|---|---|---|
| 1,898,214 A | * | 2/1933 | Richards | 111/118 |
| 1,965,510 A | * | 7/1934 | Porter | 172/21 |
| 2,975,735 A | * | 3/1961 | Purvance | 111/128 |
| 3,747,687 A | * | 7/1973 | Bodine | 172/40 |
| 4,858,697 A | * | 8/1989 | Sherblom | 172/21 |
| 5,613,565 A | * | 3/1997 | Kelly | 172/21 |
| 5,632,342 A | * | 5/1997 | Knoblich et al. | 172/21 |
| 5,769,169 A | * | 6/1998 | Miksitz | 172/21 |
| 5,803,181 A | * | 9/1998 | Hsu | |

* cited by examiner

Primary Examiner—Robert E. Pezzuto
(74) Attorney, Agent, or Firm—Haverstock, Garrett & Roberts LLP

(57) ABSTRACT

A turner for quickly, easily, and aesthetically turning over and aerating and thickening a settled or compacted layer of an aggregate landscaping mulch material, and a method for doing so. The present turner includes an elongate cylindrical barrel having an outer cylindrical surface having a diametrical extent of less than about 5 inches and a plurality of elongate projections extending generally radially outwardly from the cylindrical surface at spaced locations thereon. The turner includes a handle supporting the cylindrical barrel for rotation about a cylindrical axis thereof. The present method includes holding the handle to push or pull the cylindrical barrel across a region of the layer of the landscaping mulch material to rotate the barrel such that the projections will penetrate into the mulch material and lift and reorient portions thereof to thicken the layer, without substantially disturbing the underlying surface.

18 Claims, 5 Drawing Sheets

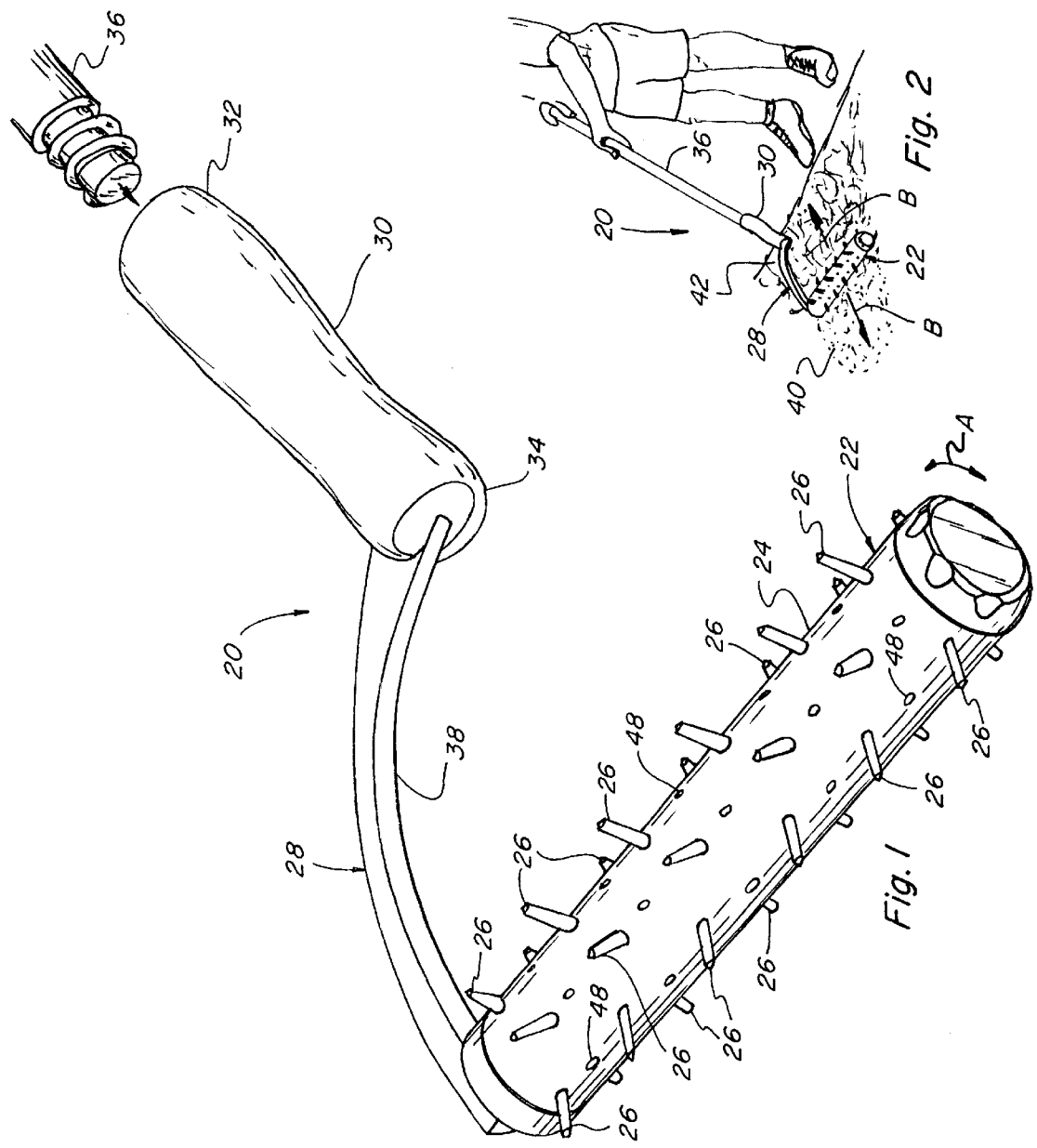

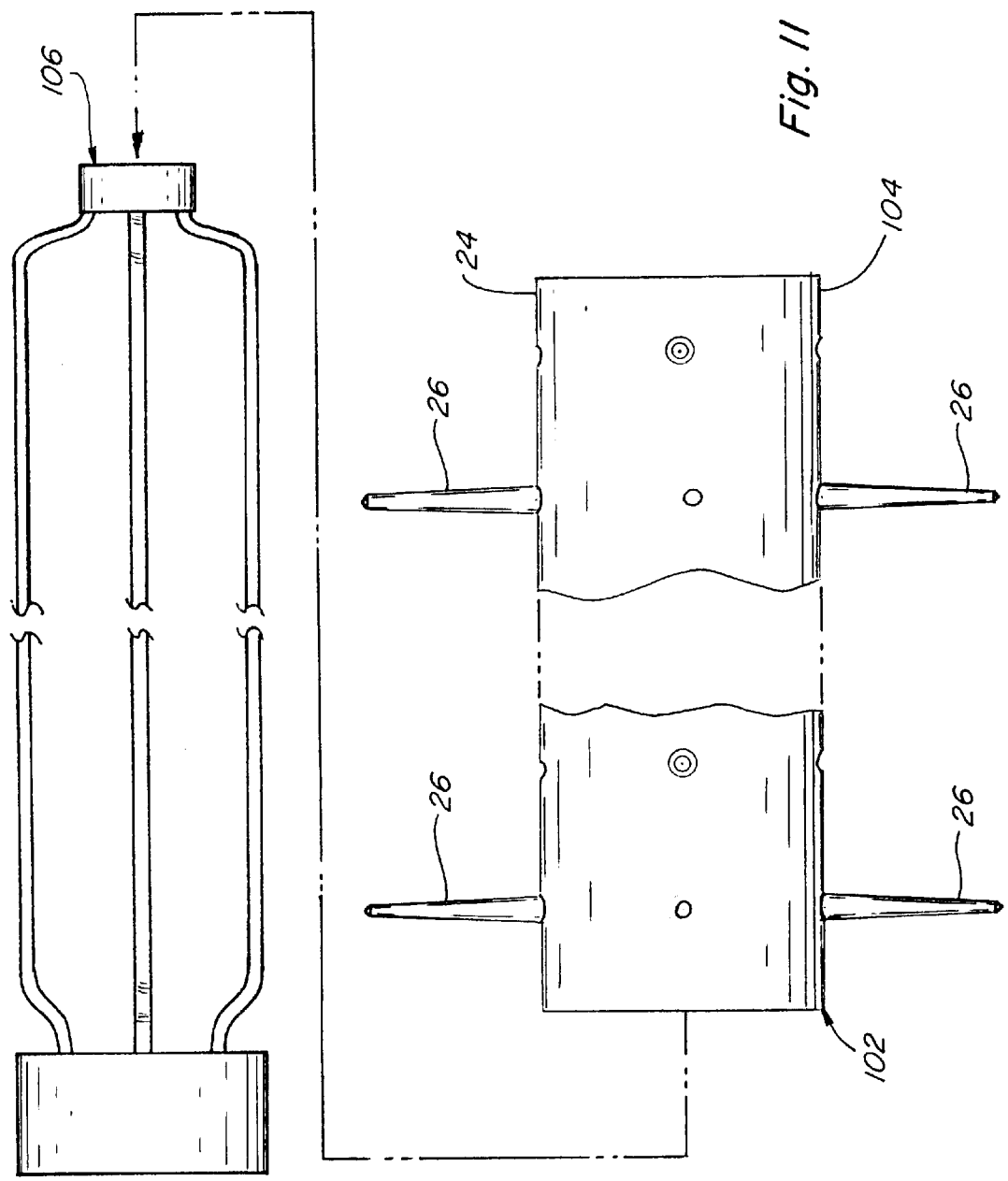

LANDSCAPING MULCH TURNER AND TREATMENT APPLICATOR AND METHOD OF USING THE SAME

This application claims the benefit of U.S. Provisional Application No. 60/239,110, filed Oct. 11, 2000.

TECHNICAL FIELD

This invention relates generally to apparatus for turning over landscaping top dressing materials such as mulches applied over soil for decorative appearance, moisture retention, and plant nourishment purposes, and more particularly, to a hand held rotary turner for turning over a mulch layer and thickening the layer for aerating and improving hydration and the appearance thereof, without significantly disturbing the underlying soil or other surface, and for optionally applying a treatment such as a fertilizer, pesticide, insecticide, fungicide, or the like to the mulch layer as it is turned, and a method for using the same.

BACKGROUND ART

Top dressings, such as, but not limited to, aggregate shredded wood mulches, wood bark mulches, leaf mulches, other organic material mulches, and man made material such as shredded vehicular tire mulches, are commonly used in landscaping beds around trees and shrubs for increasing the aesthetic appeal thereof, as well as for reducing weeds, improving hydration, aeration, and other useful purposes. Such top dressings typically have a desirable appearance when newly applied and for up to several weeks after application. However, after the passage of such time, the top dressing can begin to look dull and dirty, which is objectionable and undesirable for aesthetic purposes. Such top dressings can also naturally settle and compact so as to be less thick and as a result less permeable to water and air, which is unhealthy and undesirable for plants surrounded by the top dressing. Currently, to overcome these problems, it is known to use a conventional rake having a handle and fixed, elongate tines or fingers to "rake" mulch top dressings. However, this is typically time consuming and often produces clumps and unevenness in the top dressing, and otherwise makes the mulch look less aesthetically appealing than desired. Raking is also a fairly exerting exercise.

Still further, it is periodically desirable to apply fertilizer to landscaping plants surrounded by mulch top dressings. A problem with placing fertilizer on mulch top dressings, is that sometimes the fertilizer will not penetrate adequately through the mulch to reach underlying soil and plant roots contained therein, due to the natural compacted or settled state of the mulch. Also, applying fertilizer with known commercially available spreaders can be problematic under the canopy or foliage of low shrubs, bushes, flowers, and the like.

Accordingly, what is sought is apparatus for more easily and effectively turning over and thickening or fluffing top dressings such as wood mulches and the like, optionally including an applicator for simultaneously applying treatments such as fertilizer, insecticides, pesticides, fungicides, and the like for reaching underlying roots, which does not suffer from the aforementioned problems.

DISCLOSURE OF THE INVENTION

In accordance with the present invention, a turner for quickly, easily, and aesthetically turning over and thickening a settled or compacted layer of an aggregate landscaping mulch material for overcoming the above discussed problems, and a method for doing so, is disclosed. The present turner includes an elongate cylindrical barrel having an outer cylindrical surface having a diametrical extent of less than about 5 inches and a plurality of elongate projections extending generally radially outwardly from the cylindrical surface at spaced locations thereon. The turner includes a handle supporting the cylindrical barrel for rotation about a cylindrical axis thereof. The present method includes holding the handle to push or pull the cylindrical barrel across a region of the layer of the landscaping mulch material to rotate the barrel such that the projections will penetrate into the mulch material and lift and reorient portions thereof to thicken the layer by aeration, that is, lifting and reorienting pieces of the mulch material such that a greater number of and larger voids exist therebetween compared to when in a more settled or compacted state, without substantially disturbing the underlying surface, and without requiring significant exertion by the user.

According to another aspect of the invention, apparatus for turning over and thickening a layer of an aggregate mulch material is disclosed, the apparatus including a roller having a cylindrical outer surface with a plurality of spaced, elongate mulch lifters or projections extending generally radially outwardly therefrom at spaced locations thereon, and a handle connected to and supporting the roller for rotation about a cylindrical axis therethrough, the handle being capable of being held to easily move the roller over a region of the layer of the mulch material having portions in a first orientation such that the lifters will penetrate the portions of the mulch material and lift and turn the portions over and deposit the portions back on the layer of the mulch material in a second orientation different from the first orientation, and as a result, thicken by aeration the region of the mulch layer, again, with minimal exertion.

BRIEF DESCRIPTION OF THE DRAWINGS

FIG. 1 is a perspective view of a landscaping mulch turner according to the present invention, and an associated elongate handle extension therefor;

FIG. 2 is a perspective illustration of the mulch turner of FIG. 1 being used for turning over and thickening a region of a layer of a landscaping mulch material;

FIG. 11 is an exploded view of another alternative mulch turner according to the invention.

DETAILED DESCRIPTION OF THE PREFERRED EMBODIMENTS

Figure 7:
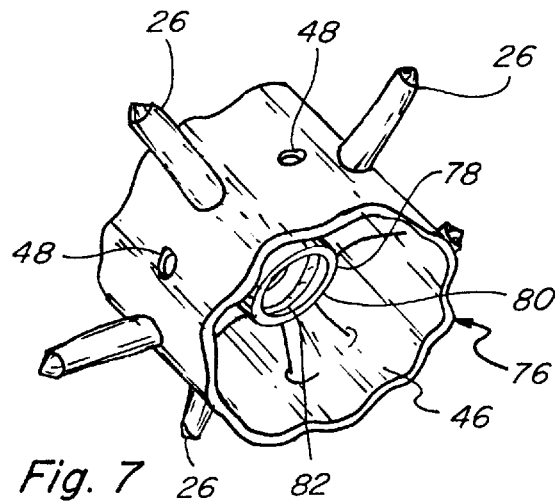
FIG. 7 is a fragmentary perspective view of an alternative roller for use with the rods of FIGS. 5 and 6.

Turning now to the drawings, wherein several preferred embodiments of the present invention are shown, in FIGS. 1 and 2, a mulch turner 20 constructed and operable according to the teachings of the present invention for turning over and thickening a settled or compacted layer of an aggregate landscaping mulch material, is shown. Turner 20 includes an elongate cylindrical roller or barrel 22 having an outer cylindrical surface 24 including a plurality of elongate mulch turning projections 26 extending generally radially outwardly from surface 24 at spaced locations thereon. Barrel 22 is preferably a hollow tube injection molded or extruded from a suitable conventional rigid, lightweight material such as plastics or aluminum, projections 26 also preferably comprising a lightweight substantially rigid plastics material injection molded in place on barrel 22, or permanently or removably affixed or mounted plastics or aluminum elements. Barrel 22 is mounted and supported in cantilever relation on a handle 28 for rotation about the cylindrical axis of barrel 22, as denoted by arrow A. Handle 28 can also be constructed of a lightweight, substantially rigid plastics material or aluminum and includes a generally cylindrical or ergometrically shaped hand grip 30 including a proximal end 32 and an opposite distal end 34, proximal end 32 preferably including a female threaded receptacle (not shown) adapted for threadedly receiving a male threaded end of an elongated extension 36 in the well known conventional manner, and distal end 34 supporting an arcuate arm 38 on which is mounted barrel 22 for rotation relative thereto.

As is illustrated in FIG. 2, a person can grasp extension 36 or hand grip 30 of handle 28, to easily push or pull barrel 22 as denoted by arrows B, with little exertion across a region of a layer of a landscaping mulch material 40, such that projections 26 will penetrate into mulch material 40 and lift and re-orient portions thereof, as represented at 42, wherein it can be envisioned that the individual pieces of the mulch material are now related to one another so as to form relatively large spaces or voids therebetween thereby aerating and thickening the mulch layer. Mulch material 40 is representative of a wide variety of aggregate mulch materials, including, but not limited to, shredded wood mulches, wood bark mulches, leaf mulches, other organic material mulches, and man-made material such as shredded vehicular tire mulches, commonly used in landscaping beds around trees and shrubs for increasing the aesthetic appeal thereof, and for reducing weeds, improving hydration, aeration, and other useful purposes.

It has been found that using a lightweight mulch turner, having components such as barrel 22, projections 26, and handle 28, made from a lightweight rigid material, such as a plastics material or aluminum, enables barrel 22 to be easily pushed and pulled to traverse over a top surface of a mulch layer, without significantly plowing or burrowing therein, but such that projections 22 can penetrate into the aggregate mulch material and when withdrawn therefrom by the rotation, lift and re-orient or flip or turn over individual pieces of the aggregate mulch material, to thereby aerate and thicken or fluff the mulch material, and improve its aesthetic look and air and water permeability. In this regard, it has been observed that typical aggregate landscaping mulches have a tendency to settle and compact over time such that a layer or the mulch material can decrease in thickness, for instance, from an original thickness of 4 to 6 inches, to a thickness of 2 inches or less, which drastically decreases the aesthetic appeal thereof, and the greater density of which reduces the ability of air and moisture to pass through the mulch from the top surface thereof, as is desired for proper aeration and hydration of plant roots contained in the underlying soil. For optimal ease of movement over and turnover and thickening or fluffing of a mulch layer, it has been found that a roller or barrel such as roller or barrel 22 should have a diametrical extent of no more than about 5 inches, and preferably about 1 to about 3 inches, and mulch lifting projections should have an average length of from about 0.7 inch to about 2.5 inches, larger lengths being best adapted for use with a larger diameter barrel 22, the preferred projection length for use with the preferred 1 to 3 inch diameter barrel being from about 1 to about 1.5 inches. In this regard, it should be noted that it has been found that by using a roller or barrel 22 having the preferred diametrical extent, with projections 26 of the preferred length, as projections 26 emerge from a mulch layer as roller or barrel 22 is rotated thereover, projections 26 will be sufficiently near to a horizontal orientation so as to effectively be capable of lifting individual pieces of the mulch material from the surface thereof sufficiently such that the pieces will roll off of projections 26 and turn over so as to be dropped back onto the mulch layer in a different orientation from their original orientation and spaced farther apart, thereby aerating and thickening or fluffing the mulch layer. Due also to the light weight of turner 20, and the length of projections 26 within the specified range, the more compacted soil or other surface underlying the mulch layer will not be significantly disturbed, that is, the soil or other underlying material will not be penetrated and brought to the top surface of the mulch layer by the projections, which is a desirable effect as weeds can grow in unintentionally exposed soil. The cantilever arrangement of handle 28 and the small diameter of barrel 22 are advantageous as they allow easy passage under low canopies and foliage of small shrubs, bushes, flowers, and other plants. The cantilever arrangement also allows easy manipulation over mulch closely around plant stems and trunks and other obstacles. Using the preferred components discussed above, as well as those discussed hereinafter, turner 20 will have an overall weight of less than about 10 pounds, and more preferably 6 to 8 pounds or less, which has been found to provide easy maneuverability and movement with minimal exertion, and also allows the turner to remain on top of the mulch layer, to provide the advantages discussed above.

Figure 3:
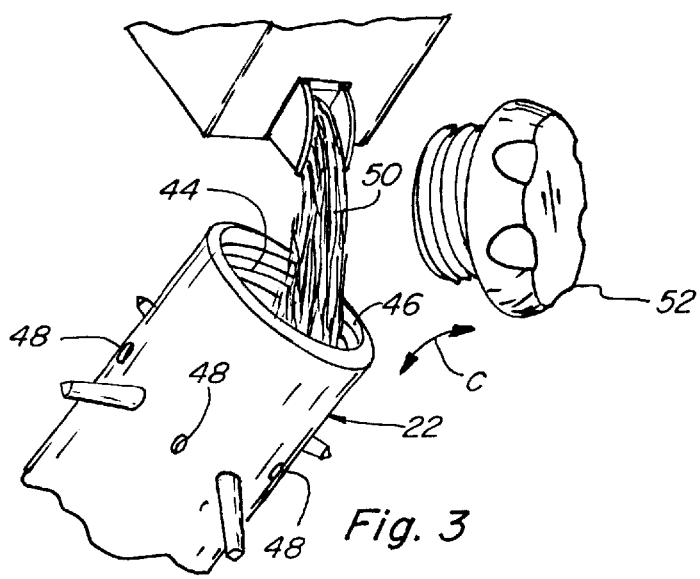
FIG. 3 is a fragmentary perspective view of the mulch turner of FIG. 1, showing a lid removed from a barrel or roller of the mulch turner for accessing an internal cavity thereof, and an aggregate treatment material being poured through the opening into the internal cavity.

Referring also to FIG. 3, as noted above, barrel 22 is of hollow tubular construction, and includes an internal cavity 44 communicating with an open end 46. Barrel 22 includes a plurality of optional, spaced holes 48 extending therethrough between outer cylindrical surface 24 and internal cavity 44. As shown, internal cavity 44 is adapted for receiving an aggregate, granular, powder, or liquid treatment material 50, such as, but not limited to, a fertilizer, an insecticide, a pesticide, a fungicide, the combination of the above, or other material, to be dispensed through holes 48 as barrel 22 is rotated over a mulch layer. Open end 46 can be enclosed or covered by a cap or lid 52, threadedly, frictionally, or otherwise removably positionable therein or thereover, as denoted by arrow C.

Figure 4:
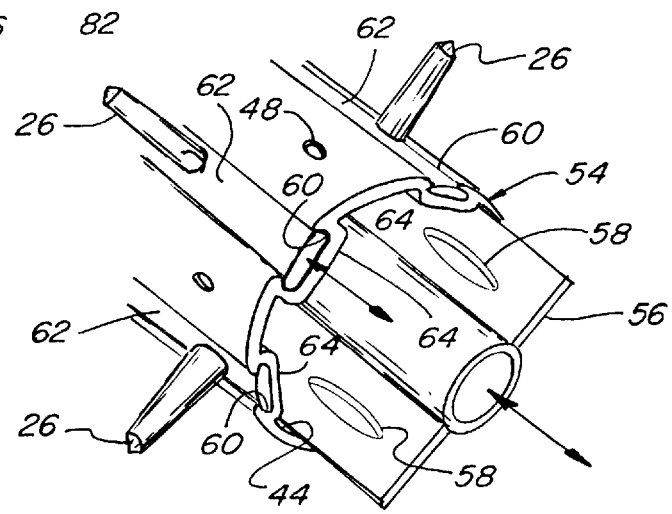
FIG. 4 is a fragmentary perspective view of an alternative barrel or roller construction for use with the mulch turner of FIG. 1, including an optional agitator slidably receivable in an internal cavity of the barrel, and projections extending radially outwardly from the barrel located on removable elongate strips.

Referring also to FIG. 4, an alternative roller or barrel 54 for use with mulch turner 20 is shown, like parts of barrel 54 and barrel 22 being identified by like numbers. Barrel 54 is a hollow tubular member of injection molded plastics material or extruded lightweight rigid plastics or aluminum, and includes an outer cylindrical surface 24 having a plurality of mulch lifting projections 26 extending generally radially outwardly therefrom. Barrel 54 includes a plurality of optional holes 48 therethrough communicating with an internal cavity 44, for dispensing an aggregate, granular, powder, or liquid treatment material, in the above-described manner. Additionally, barrel 54 includes an elongate agitator 56 extending longitudinally through internal cavity 44 and mounted to handle 28 (FIG. 1) in fixed, non-rotating relation thereto, such that as barrel 54 rotates about agitator 56, the treatment material in internal cavity 44 will be agitated thereby, for breaking up lumps or mixing the material for easier passage through holes 48. Agitator 56 can include optional openings 58 therein at spaced locations therealong, for facilitating straining, distribution, and mixing of the treatment material. Still further, barrel 54 can include longitudinally extending notches 60 in surface 24 having a dovetail or other suitable sectional shape, for receiving and holding elongate strips 62 including projections 26, to facilitate manufacture, and/or allow the insertion and removal of strips 62 including projections 26 having different characteristics suited for different mulching applications, such as different lengths, shapes, and/or widths or transverse dimensions. Barrel 54 can include protuberances 64, such as for forming notches 60, which extend into internal cavity 44 a sufficient extent so as to be contacted by at least the lower portion of agitator 56 when barrel 54 is rotated relative thereto, and agitator 56 can be made of a sufficiently resilient flexible material or include a live hinge or other flexible or bendable portion so as to be bendable or flexible when contacted by protuberances 64 to allow the protuberances to pass thereby, and then to spring or flex back with sufficient velocity to contact and break up lumps of the aggregate or granular treatment material into the desired smaller size for passage through holes 48.

Figure 5:
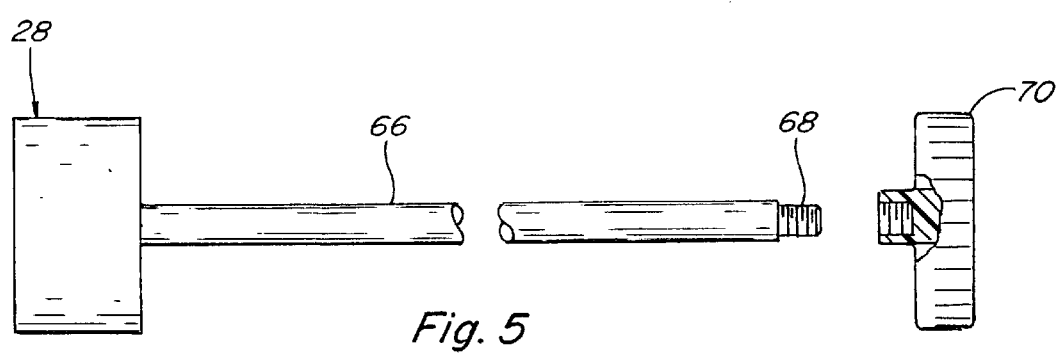
FIG. 5 is a fragmentary side view of a handle for the mulch turner of FIG. 1, showing an elongate rod thereof for supporting the cylindrical barrel or roller for rotation thereon, and one means for retaining the barrel or roller.
Figure 6:
FIG. 6 is a fragmentary side view of an alternative rod for the handle of FIG. 5, including alternative means for retaining the barrel or roller.

Referring to FIG. 5, handle 28 is shown without barrel 22 or barrel 54 thereon, to reveal a rod 66 which passes centrally through and supports barrel 22 or 54. Rod 66 is preferably made of a rigid plastics material or aluminum and can include a male threaded distal end 68 threadedly engageable with a female threaded cap 70 for retaining barrel 22 or 54 on rod 66. Referring to FIG. 6, rod 66 is shown including an alternative distal end 72, having a detent groove 74 therein for receiving a detent of a barrel or roller for retaining it on rod 66, as shown in FIG. 7.

In FIG. 7, an alternative roller or barrel 76 is shown, including an annular flange 78 supported centrally therein including a passage 80 therethrough adapted for cooperatively receiving rod 66 of handle 28 for relative rotation therein, and an annular detent 82 around passage 80 receivable in detent groove 74 of rod 66 for retaining barrel 76 thereon. Barrel 76 is shown including projections 26 thereon and optional holes 48 therethrough, it being contemplated that open end 46 can remain open, or be enclosed by a suitable cap or other closure for containing treatment material therein, as desired.

Figure 10:
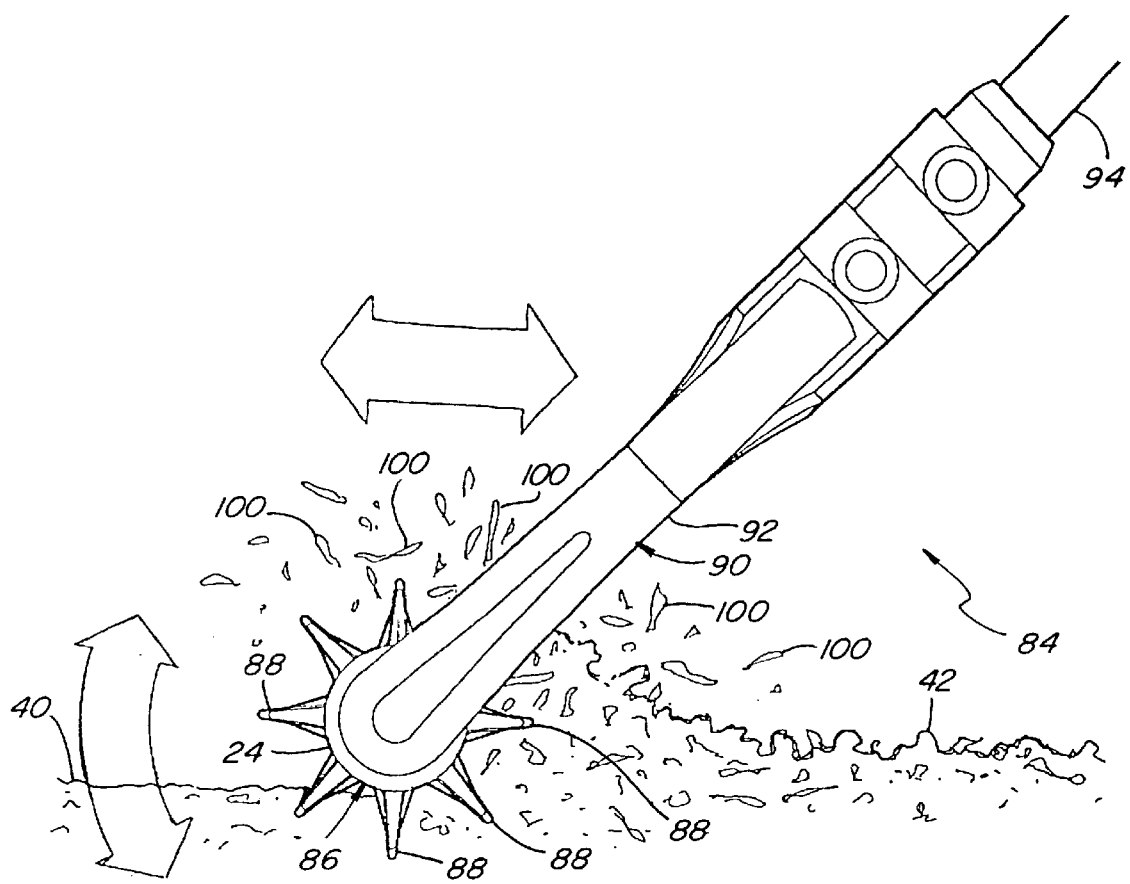
FIG. 10 is an end view of the mulch turner of FIGS. 8 and 9 being used for turning and thickening a layer of a mulch material.
Figure 8:
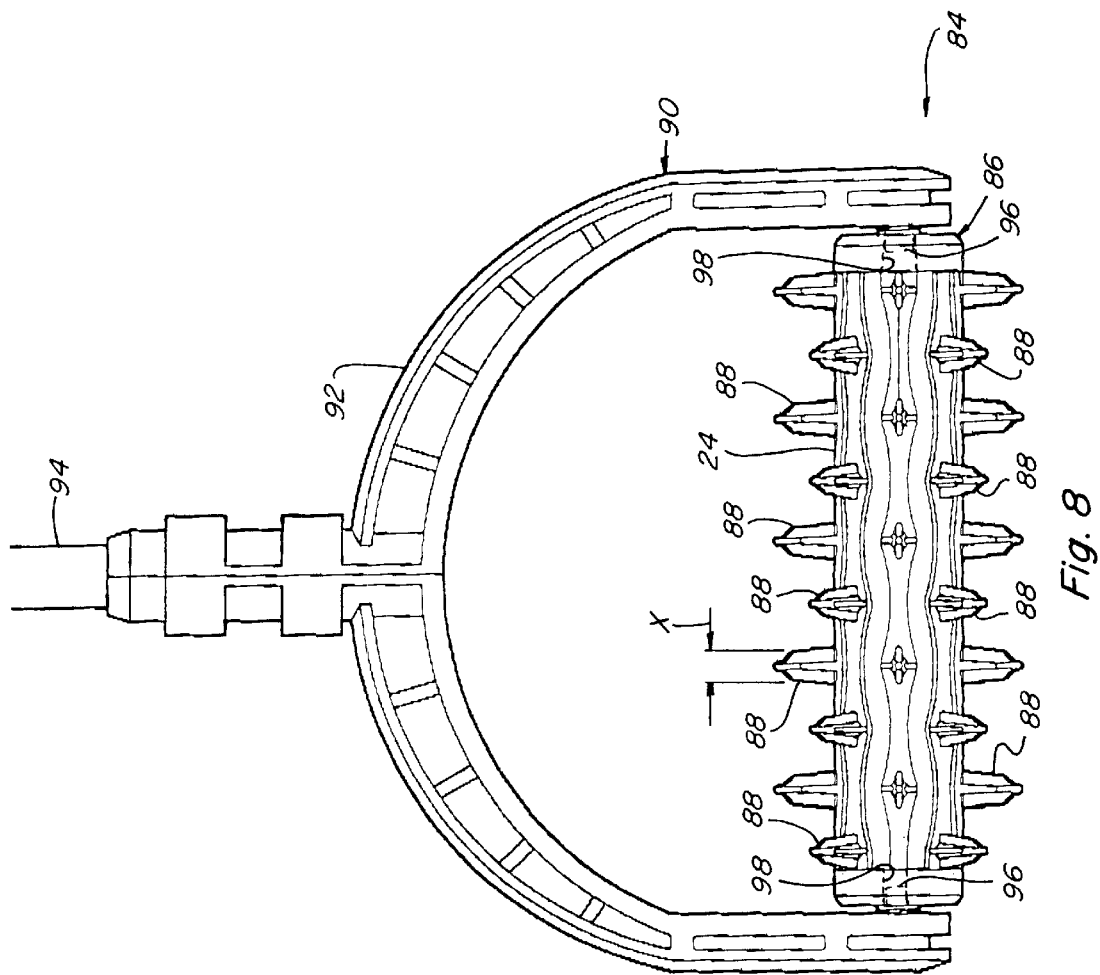
FIG. 8 is a side view of an alternative mulch turner according to the present invention.
Figure 9:
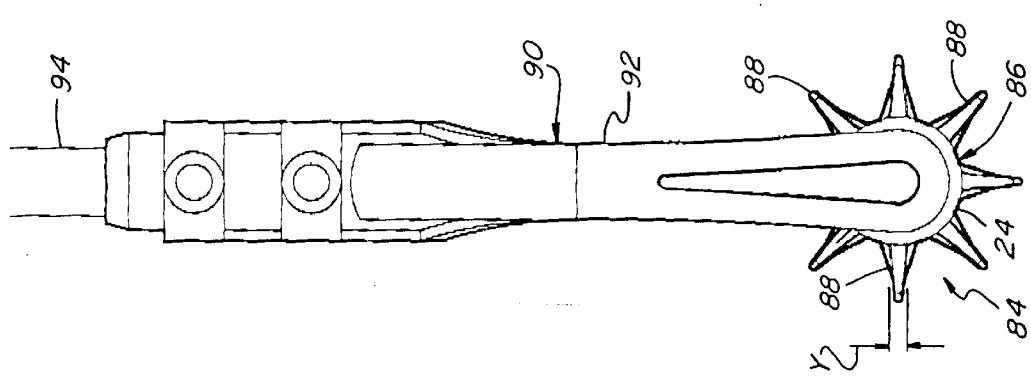
FIG. 9 is an end view of the mulch turner of FIG. 8.

Referring now to FIGS. 8, 9, and 10, an alternative mulch turner 84 constructed and operable according to the teachings of the present invention is shown, like parts of mulch turner 84 and mulch turner 20 being identified by like numbers. Mulch turner 84 includes an elongate cylindrical barrel or roller 86, including an outer cylindrical surface 24 having a plurality of radially outwardly projecting mulch lifting projections 88 extending generally radially outwardly therefrom. Again, roller 86, like barrels 22, 54 and 76, is preferably a tubular, rigid lightweight plastics or aluminum member, projections 88 preferably being molded of a like material in place thereon, or affixed thereto. Roller 86 is mounted for rotation and supported at both opposite ends thereof on a handle 90 which includes an arcuate arm 92 which spans roller 86 and includes a centrally extending elongate handle extension 94, similar in length to extension 36 discussed earlier. Handle 90 and extension 94 are likewise preferably made from a lightweight, injection molded or extruded plastics or aluminum material, and handle 90 can include suitable means, such as knobs or stub shafts 96 projecting in opposing relation from opposite ends of arm 92 for cooperative receipt in receptacles 98 in the opposite ends of roller 86, for rotatably supporting roller 86. Here, it should be noted that projections 88 are distinguishable from earlier discussed projections 26 in that projections 88 have a transverse extent or width in the axial direction with respect to roller 86, denoted by the dimension X in FIG. 8, which is substantially greater than a thickness thereof in the direction of rotation, denoted by dimension Y in FIG. 9. This is desirable, as it has been found to provide improved lifting and turning over of individual mulch pieces or portions when mulch turner 86 is pushed or pulled across a mulch layer. Roller 86 and projections 88 can have other dimensions as set forth with respect to barrel 22 and projections 26 above. Similarly, mulch turner 84 can be easily pushed or pulled using extension 94 to rotate roller 86 over a bed or layer of aggregate mulch material 40 such as those mentioned above, such that projections 88 are driven or penetrate into the mulch material 40, and emerge therefrom to lift and turn over or re-orient individual mulch pieces 100, such that the mulch layer will be thickened or fluffed as denoted at 42 with respect to the original thickness thereof, denoted at 40, for providing the desired aesthetic and other effects mentioned above. Again, it should be noted that due to the light weight of mulch turner 84, roller 86 itself will not penetrate significantly into mulch material 40, nor plow therethrough, such that projections 88 will work in the above-described manner to provide the desired effect. Here, it can be observed that projections 88 emerging from the mulch material on the right-hand side of roller 86 in FIG. 10, are nearly horizontal, or oriented at a sufficiently small acute angle to horizontal, so such that individual mulch pieces 100 are lifted and overturned or variously agitated thereby to achieve the aeration and thickening effect. It should also be noted that due to the relatively small diametrical extent of roller 86 within the above-described range, relatively high rotational velocity of projections 88 can be achieved by rotating roller 86 relatively rapidly, such as anticipated to be possible for the average homeowner, gardener, or groundskeeper to achieve when pushing or pulling extension 94, with minimal exertion. It should be noted that the configurations and advantages of roller 86 and projections 88 can be incorporated into previously discussed barrels 22, 54 and 76, and visa versa, and that those barrels could alternatively be used with a handle such as handle 90. It should also be noted that turner 84 including any of the barrels and rollers discussed above as well as extension 94 will have a weight of 10 pounds or less, and preferably 6 to 8 pounds or less, for ease of maneuverability and movement and so as to remain on top of the mulch when moved thereover.

In FIG. 11, still another alternative mulch turner 102 constructed and operable according to the teachings of the present invention is shown, mulch turner 102 being operable in the above-described manner, and like parts of mulch turner 102 and mulch turners 20 and 84 being identified by like numbers. Mulch turner 102 includes a hollow tubular roller 104 having an outer cylindrical surface 24 including a plurality of projections 106 extending generally radially outwardly therefrom at spaced locations thereon for lifting and re-orienting, overturning and aerating mulch when roller 104 is rolled thereover, roller 104 having an open ended internal cavity therethrough (not shown) adapted for frictionally receiving a rotatable frame 106 of wire or other elements, such as those widely commercially available and known for holding and retaining paint rollers, frame 106 being supported for rotation in cantilever relation on a conventional paint roller handle, as is well known in the art. Turner 102 is also light weight, in the range of less than 10 pounds.

Thus, there has been shown and described a novel invention in several embodiments of a light weight, easy to use rotatable mulch turner which overcomes many of the problems set forth above. It will be apparent, however, to those familiar in the art, that many changes, variations, modifications, and other uses and applications for the subject device are possible. All such changes, variations, modifications, and other uses and applications that do not depart from the spirit and scope of the invention are deemed to be covered by the invention which is limited only by the claims which follow.

What is claimed is:

1. A turner for turning over and thickening a settled layer of an aggregate landscaping mulch material lying on a surface, comprising:
   an elongate cylindrical barrel having an outer cylindrical surface having a diametrical extent of less than about 3 inches and a plurality of elongate projections extending generally radially outwardly from the cylindrical surface at spaced locations thereon, the projections having an average length of at least about 1 inch; and
   a handle supporting the cylindrical barrel for rotation about a cylindrical axis thereof, wherein the handle can be held to push or pull the cylindrical barrel across a region of the layer of the landscaping mulch material to rotate the barrel such that the projections will penetrate into the mulch material and lift and reorient portions thereof to thicken the layer, without compacting the mulch material and without substantially disturbing the underlying surface.

2. The turner of claim 1, wherein the projections have an average length of from about 1 inch to about 2.5 inches.

3. The turner of claim 1, wherein the barrel includes an internal cavity for receiving an aggregate or liquid treatment material to be applied to the mulch material, and holes at spaced locations through the barrel for passage of the treatment material from the internal cavity to the mulch material when the barrel is rotated.

4. The turner of claim 3, wherein an agitator is mounted in the internal cavity so as to remain stationary therein as the barrel is rotated for agitating the treatment material in the cavity.

5. The turner of claim 4, wherein the barrel includes an opening in connection with the internal cavity and a lid removably positioned in closing relation to the opening.

6. The turner of claim 4, wherein the agitator is resiliently flexible and the barrel includes elements in the internal cavity in position for releasably contacting and resiliently flexing the agitator when the barrel is rotated such that the agitator will be released to move against lumps of the treatment material at a speed greater than a speed of the rotation to break up the lumps.

7. The turner of claim 1, wherein longitudinally adjacent ones of the projections are located on elongate strips cooperatively received and retained in elongate slots on the cylindrical surface of the barrel.

8. The turner of claim 1 wherein the diametrical extent of the cylindrical barrel is between about 1 inch and about 3 inches.

9. The turner of claim 1, wherein the handle has an elongate portion of sufficient length to enable a person to hold a distal end of the handle for pushing or pulling the cylindrical barrel over the region of the mulch material.

10. The turner of claim 1, wherein at least some of the elongate projections each have a transverse extent in a direction generally parallel to the axis of the drum which is greater than a transverse extent of the projections in a direction perpendicular to the axis of the drum.

11. Apparatus for turning over and thickening a layer of an aggregate mulch material on an underlying surface of a compacted material, comprising:
    a roller having a cylindrical outer surface with a plurality of spaced, elongate mulch lifters extending generally radially outwardly therefrom at spaced locations thereon, and
    a handle connected to and supporting the roller for rotation about a cylindrical axis therethrough, the handle being capable of being held to move the roller over a region of the layer of the mulch material having portions in a first orientation and the roller having a sufficiently small diametrical extent and the mulch lifters being sufficiently long such that the lifters will penetrate the portions of the mulch material and lift and turn the portions over and deposit the portions back on the layer of the mulch material in a second orientation different from the first orientation and so as to increase the vertical extent of the region of the layer so as to have larger spaces and voids between individual portions of the mulch material compared to prior to when the portions of the mulch material were lifted and turned by the lifters for aerating the mulch material without significantly disturbing the underlying surface of the compacted material.

12. The apparatus of claim 11, wherein the mulch lifters have an average length of from about 0.7 inch to about 2.5 inches.

13. The apparatus of claim 11 wherein the diametrical extent of the roller is between about 1 inch and about 3 inches.

14. The apparatus of claim 11, wherein the handle has an elongate portion of sufficient length to enable a person to hold a distal end of the handle for pushing or pulling the roller over the region of the layer of the mulch material.

15. The apparatus of claim 11, wherein at least some of the mulch lifters have a transverse extent in a direction generally parallel to the axis of the roller which is greater than a transverse extent of the lifters in a direction perpendicular to the axis of the roller.

16. The apparatus of claim 11, wherein the roller comprises a tube cooperatively received and retained over an elongate frame mounted for rotation on the handle.

17. A method for turning over and thickening a settled layer of an aggregate landscaping mulch material lying on a surface, comprising the steps of:
    providing an elongate cylindrical barrel having an outer cylindrical surface having a diametrical extent of less than about 3 inches and a plurality of elongate mulch lifters extending generally radially outwardly from the cylindrical surface at spaced locations thereon, the mulch lifters having an average radial outward extent from the barrel of at least about 1 inch and adjacent ones of the mulch lifters longitudinally along the outer cylindrical surface being spaced between about 1 inch and about 4 inches apart;

providing a handle supporting the cylindrical barrel for rotation about a cylindrical axis thereof:

holding the handle and pushing or pulling the cylindrical barrel across a region of the layer of the landscaping mulch material to rotate the barrel such that the mulch lifters will penetrate into the mulch material and lift and reorient portions thereof to aerate and thicken the layer, without substantially disturbing the underlying surface.

18. The method of claim 17, wherein the barrel includes an internal cavity containing a granular or liquid treatment material to be applied to the mulch material and holes through the cylindrical outer surface such that the treatment material will be distributed through the holes to the region of the mulch material as the barrel is pushed or pulled thereacross and rotated.

* * * * *